United States Patent [19]

Ahmed et al.

[11] Patent Number: 5,500,460
[45] Date of Patent: Mar. 19, 1996

[54] COMPOSITION AND PROCESS FOR AND ARTICLE WITH IMPROVED AUTODEPOSITED SURFACE COATING BASED ON EPOXY RESIN

[75] Inventors: Bashir M. Ahmed, Ambler; Rohitha M. Jayasuriya, Quakertown; Thomas R. Hopkins, Wycombe, all of Pa.

[73] Assignee: Henkel Corporation, Plymouth Meeting, Pa.

[21] Appl. No.: 434,115

[22] Filed: May 2, 1995

Related U.S. Application Data

[63] Continuation of Ser. No. 346,992, Nov. 30, 1994, abandoned, which is a continuation of Ser. No. 264,585, Jun. 23, 1994, abandoned, which is a continuation of Ser. No. 416,167, Oct. 2, 1989, abandoned.

[51] Int. Cl.$^6$ .............. C08K 3/20; C08L 63/00; C08F 283/00
[52] U.S. Cl. .......... 523/402; 523/415; 524/589; 525/528; 525/530; 525/533
[58] Field of Search ............. 525/528, 530, 525/533; 523/402, 415; 524/589

[56] References Cited

U.S. PATENT DOCUMENTS

| | | | |
|---|---|---|---|
| 3,592,699 | 7/1971 | Steinbrecher et al. | 148/6.2 |
| 4,064,294 | 12/1977 | Babil | 521/146 |
| 4,177,177 | 12/1979 | Vanderhoff et al. | 260/29.2 |
| 4,180,603 | 12/1979 | Howell, Jr. | 427/353 |
| 4,186,219 | 1/1980 | Hall | 427/8 |
| 4,233,197 | 11/1980 | Howell, Jr. | 260/29.4 |
| 4,255,305 | 3/1981 | Howell, Jr. | 428/416 |
| 4,289,826 | 9/1981 | Howell, Jr. | 428/418 |
| 4,411,937 | 10/1983 | Nishida et al. | 427/435 |
| 4,423,171 | 12/1983 | Holubka | 523/454 |
| 4,522,851 | 6/1985 | Rosthauser | 524/591 |
| 4,608,304 | 8/1986 | Rosthauser | 428/394 |
| 4,711,917 | 12/1987 | McCollum et al. | 523/415 |
| 4,758,621 | 7/1988 | Broadbent | 524/575 |
| 4,847,122 | 7/1989 | Goldberg | 427/410 |
| 4,981,759 | 1/1991 | Nakatani et al. | 428/626 |

OTHER PUBLICATIONS

"Fluorad™ Coating Additives", Jun. 1986, 3M Company.

*Primary Examiner*—Melvyn I. Marquis
*Assistant Examiner*—Randy Gulakowski
*Attorney, Agent, or Firm*—Wayne C. Jaeschke; Norvell E. Wisdom, Jr.; Beatrice N. Robbins

[57] ABSTRACT

The quality of coating in autodeposition from solutions in which the coating is predominantly derived from epoxy resins can be improved in two ways, which can be used jointly or separately: A blocked isocyanate is used as cross linking agent for the epoxy resin, and a surfactant that prevents the occurrence of phase separation during drying of the coating is used. Preferably the surfactant is a fluoroaliphatic polymer ester.

12 Claims, No Drawings

COMPOSITION AND PROCESS FOR AND ARTICLE WITH IMPROVED AUTODEPOSITED SURFACE COATING BASED ON EPOXY RESIN

This application is a continuation of application Ser. No. 08/264,585 filed Jun. 23, 1994, which was a continuation of application Ser. No. 07/416,167 filed Oct. 2, 1989 now abandoned.

FIELD OF THE INVENTION

This invention relates to the use of aqueous liquid compositions (solutions or dispersions) with which active metal surfaces can be coated, by mere contact with the liquid composition, with an adherent polymer film that increases in thickness the longer the time of contact, even though the liquid composition is stable for a long time against spontaneous precipitation or flocculation of any solid polymer, in the absence of contact with active metal. (For the purposes of this application, the term "active metal" is to be understood as including iron and all the metals and alloys more active than iron in the electromotive series.) Such liquid compositions are denoted in this specification, and commonly in the art, as "autodeposition" or "autodepositing" compositions, dispersions, emulsions, suspensions, baths, solutions, or a like term. Autodeposition is often contrasted with electrodeposition, which can produce very similar adherent films but requires that the surfaces to be coated be connected to a source of direct current electricity for coating to occur.

In particular, this invention is concerned with autodeposition of high quality coatings based on epoxy resins.

DESCRIPTION OF RELATED ART

U.S. Pat. No. 3,592,699 of Jul. 13, 1971 to Steinbrecher et al. is one of the early basic patents on autodeposition. It teaches autodeposition baths generally containing an appropriate polymer latex, an appropriate amount of a soluble accelerator or oxidizing agent such as hydrogen peroxide or dichromate ion, fluoride ions, and sufficient acid to keep the pH within the range of about 2.5–3.5.

Examples of suitable polymer dispersions, pigments, and other ingredients that can constitute the preponderance of autodeposited coatings are taught in U. S. Pat. No. 4,411,937, especially in column 3 lines 24–50 and column 7 lines 23–63. Additional examples are described in U.S. Pat. 4,186,219, especially in column 3 line 53 to column 4 line 48. Examples of epoxy resins and some cross linking agents for them that are suitable for use in autodepositing compositions are taught in U. S. Pat. Nos. 4,180,603 of Dec. 25, 1979, 4,233,197 of Nov. 11, 1980, and 4,289,826, all to Howell, Jr. None of these patents teaches any use of isocyanates as cross linking agents, and operation according to the directions of any of these patents has generally been found by the present applicants to produce autodeposited film thicknesses no greater than 1.7 microns per minute of contact with the autodeposition composition ("μm/min") at 20°–25° C.

The use of "homogenization", i.e., subjecting crude emulsions with relatively large dispersed particles to mechanical comminuting forces in the presence of surfactant, in order to produce more stable emulsions with smaller dispersed particles, in preparing synthetic polymer emulsions is taught in U.S. Pat. No. 4,177,177 of Dec. 4, 1979 to Vanderhoff et al.

A product information bulletin titled "Fluorad™ Coating Additives" published by the 3 M Company, St Paul, Minn. in June, 1986 describes coating defects such as creeping and cratering as susceptible to solution by use of FC-430 additive.

It is an object of this invention to provide suitable compositions and processes for relatively rapid autodeposition of surface coatings based on epoxy resins that are thick and continuous enough to be more protective than those achieved in the prior art.

DESCRIPTION OF THE INVENTION

Except in the operating examples, or where otherwise explicitly indicated, all numerical quantities in this description indicating amounts of material or reaction conditions are to be understood as modified by the word "about".

It has now been found that autodeposition baths that contain, as the primary film forming components, (i) epoxy resins derived from diglycidyl ethers of bisphenol-A and (ii) crosslink promoting curatives for such epoxy resins, can be improved in two ways, which may advantageously used in combination: (1) a sufficiently large amount of emulsifying agent can prevents development of coverage defects such as cracks or craters in the coatings during drying and cure and (2) a fully blocked diisocyanate that is stable in the acid environment that is preferred for autodeposition baths, in order to facilitate film formation at a practically useful speed, can be used as the sole or predominant crosslink promoting curative agent.

One important advantage achieved by a process according to this invention is a faster rate of film formation. Rates of over 5 μm/min at room temperature are readily achieved.

Preferred compositions of autodeposition baths according to the present invention consist essentially of the following components:

(A) from 1 to 20, preferably from 2 to 10, % by weight of an epoxy resin component consisting of molecules having formula I as follows:

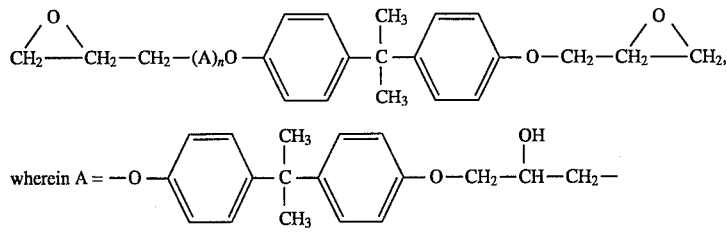

wherein A = and n is an integer from 0 to 50, preferably from 0 to 20, more preferably from 0 to 6;

(B) an emulsifying component in sufficient quantity to stably emulsify component (A);

(C) from 0.1 to 20, preferably from 0.2 to 10, % by weight of a cross-linking component selected from one or both of the following molecular types:

(1) molecules containing at least two functional groups, such as amine, amide, imine, thiol, hydroxyl, carboxyl, and carboxylic acid anhydride, that are capable of chemical addition reactions with epoxy groups when mixed with molecules of formula I and heated to a temperature of at least 100° C.; and (2) molecules containing at least two isocyanate groups, each such group being blocked with a conventional blocking agent or internally blocked by formation of a uretdione structure, so that the blocked isocyanate group does not react at any appreciable rate at room temperature with hydroxyl groups but does react rapidly with such groups after being unblocked by heating to a temperature of at least 160° C.;

(D) an accelerator component, such as acid, oxidizing agent, and/or complexing agent, in sufficient amount to cause the dissolution of active metals from active metal surfaces in contact with the composition at a temperature of at least 20° C. at a rate of at least 0.020 gram equivalent weights of metal ions per hour per square decimeter of contacted metal surface; and, optionally, (E) pigments, dyes, or other chemically stable colorant materials;

(F) finely divided solids suitable as fillers in the coatings to be formed from the composition, such as silicates, borates, mica, talc, and clays; and (G) water to form the balance of the composition. The composition is regarded as stably emulsified if no more than 1% by weight of the solids content of the composition spontaneously separates from the composition in 30 days storage at room temperature in the absence of contact with active metal.

Preferably, component (A) has an average molecular weight in the range from 500–10,000, or more preferably in the range from 800–7,000. Preferably the average number of epoxide groups per molecule in component (A) is in the range from 1.7–2.5, or more preferably in the range from 1.9–2.1.

Component (B) may be any suitable material as known in the art. It is highly preferred, however, that component (B) be selected to have another property not previously achieved in the art: the ability to prevent the formation of open spots or other covering defects in the coatings formed from the composition, without unacceptably reducing the corrosion protection offered to the underlying metal by the coating formed by autodeposition.

The applicants, while not wishing to be bound by any particular theory, believe that the occurrence of coating flaws during coating with epoxy resin based autodeposition compositions in the prior art has been associated with phase separations that occur during the progress of the cross-linking reaction(s), as a result of the random nature of initiation of cross linking and the tendency of growing cross linked polymer molecules to segregate spontaneously into one or more phases separate from the remaining unreacted resin. It has been found that the use of large quantities of conventional surfactant emulsifying agents can prevent such coating coverage defects, but the quantities required for this purpose are sufficiently large to reduce the protective value of the coatings, presumably because of reactions with the other constituents of the bath that change the chemical structure of the polymer film formed in a way that is deleterious to its protective value. It has been found, however, that certain fluorochemical emulsifying agents, specifically fluoroaliphatic polymeric esters, are free from this disadvantage. The use of fluoroaliphatic polymeric esters, at concentrations of 0.1 to 2.0 grams per liter (g/L) of total composition, more preferably at 0.3–1.0 g/L, or still more preferably at 0.3–0.5 g/L, is therefore highly preferred.

If component type (C)(1) is used, its constituents preferably have terminal amine, carboxylic acid, or amide groups.

If component type (C)(2) is used, as is generally preferred, its constituents preferably are chosen from molecules of the general formula II:

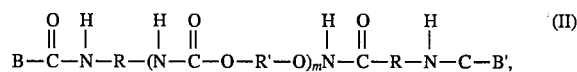

$$B-\overset{O}{\underset{\|}{C}}-\overset{H}{\underset{|}{N}}-R-(\overset{H}{\underset{|}{N}}-\overset{O}{\underset{\|}{C}}-O-R'-O)_m\overset{H}{\underset{|}{N}}-\overset{O}{\underset{\|}{C}}-R-\overset{H}{\underset{|}{N}}-\overset{O}{\underset{\|}{C}}-B',$$ (II)

wherein each of B and B' independently is a monovalent moiety formed by removing the most active hydrogen atom from an amine, alcohol, amide, or oxime molecule; each of R and R' independently is a divalent hydrocarbon or carbonyl-hydrocarbon moiety derived by removing any two hydrogen atoms not attached to the same carbon atom from any hydrocarbon, or oxyhydrocarbon in which all oxygen atoms present are in carbonyl groups, having from 2 to 20 carbon atoms and having no unsaturation except aromatic and carbonyl unsaturation; and m is an integer from 0–20, preferably from 0–10. The blocking groups B and B', which preferably are the same, can be derived from any suitable aliphatic, cycloaliphatic, aromatic, or alkylaromatic monoalcohol, monoamide, monoamine, or monooxime. Most preferably, the blocking groups are amides.

Component (D) is preferably chosen from the group consisting of hydrofluoric acid and its salts, fluorosilicic acid and its salts, fluorotitanic acid and its salts, ferric ion, acetic acid, phosphoric acid, sulfuric acid, nitric acid, hydrogen peroxide, peroxy acids, citric acid and its salts, and tartaric acid and its salts. The pH of the composition preferably is in the range of 2–4.

A process according to this invention comprises steps of contacting an object with an active metal surface with an autodeposition composition according to the invention, as described above, for a sufficient time to cause the formation of a polymer film of a pre-determined thickness on the metal surface, separating the coated metal surface from contact with the autodepositing composition, rinsing the coated metal surface to remove at least some of the absorbed but otherwise unadhered solids in the autodeposition composition from the more adherent solid part of the coating, and heating the rinsed surface to form a final film.

Optionally, a reagent to cause additional desirable reactions in the coated film may be included in the rinse used after cessation of contact between the wet coated surface and the bulk of the autodeposition composition, and/or separate treatment compositions for the wet coated films may be brought into contact with the wet coated films after rinsing, and such treatment(s) followed by additional rinsing(s), before final heating of the treated film.

In general, the compositions of this invention produce wet coated films that can be heated after simple rinsing with tap or deionized water to give good quality final films, without the need for post-coating treatments that have often been recommended in the prior art. Many of these post-coating treatments contain chromium or other environmentally undesirable constituents, so that their use is preferably avoided in most cases. Contact between surfaces to be treated and compositions according to this invention, rinses, or other treatment compositions can be effected by any convenient method, such as immersion, spraying, roll coating, or the like, including combinations of more than one method.

Preferably, contact between active metal surfaces and the autodeposition compositions according to this invention is for a time between 0.5 and 10 minutes, more preferably between 1 and 3 minutes. Contact preferably is long enough to produce a final film thickness between 15 and 50 μm, more preferably between 24 and 35 μm. Final heating of the rinsed wet coated and optionally posttreated films is preferably at a temperature between 130° and 200° C., more preferably between 150° and 195° C., for a time of 3 to 60 minutes, more preferably for 10 to 30 minutes.

The practice of this invention may be further appreciated from the following working examples.

The first step in preparing an autodeposition bath is to prepare a suitable dispersion of the ingredients that will form the bulk of the eventual autodeposited coatings.

DISPERSION EXAMPLES 1 AND 2

The ingredients for these example were used in the following amounts:

| Ingredient | Parts by Weight Used for: | |
|---|---|---|
| | Example 1 | Example 2 |
| Epon ™ Resin 1001F | 300 | 400 |
| IPDI-BF 1540 ™ | 100 | 132 |
| Alipal ™ CO-436 | 18 | 25 |
| Hexadecane | 25 | 35 |
| Toluene | 720 | 532 |
| Methyl Iso-butyl Ketone ("MIBK") | 80 | 532 |
| Deionized water | 2370 | 2348 |

Epon™ 1001F resin is a commercial epoxy resin from Shell Chemical Co., with an equivalent weight per epoxide unit of about 500, made by reaction of epichlorohydrin with bisphenol-A. IPDI-BF 1540™ is a commercial diol extended isophorone diisocyanate prepolymer having an internally blocking uretdione structure, available from H üls America, Inc. Alipal™ CO-436 is a commercial emulsifying agent, the ammonium salt of an alkyl phenol condensed with an average of four ethylene oxide units per molecule, available from GAF Corporation.

To make a dispersion, the epoxy resin, blocked diisocyanate, and hexadecane were all dissolved together in a mixture of the toluene and MIBK. This solution was then mixed with the emulsifying agent dissolved in deionized water. The resulting mixture was initially unstable, but it was homogenized in a Manton-Gaulin Dispersator™ to form a stable emulsion. All the organic solvents and some water were then removed from the emulsion by stripping under vacuum in a rotary evaporator to produce a stable dispersion of the resin and blocked diisocyanate in water. The solids content of these dispersions was 17.9% by weight for Example 1 and 20% by weight for Example 2.

DISPERSION EXAMPLES 3 AND 4

The ingredients for these example were used in the following amounts:

| Ingredient | Parts by Weight Used for: | |
|---|---|---|
| | Example 3 | Example 4 |
| Epon ™ Resin 1001F | 75 | 466 |
| IPDI-BF 1540 ™ | 25 | 60 |
| Alipal ™ CO-436 | 5 | 14 |
| Hexadecane | 7 | 35 |
| Toluene | 100 | 532 |
| Methyl Iso-butyl Ketone ("MIBK") | 100 | 532 |
| Deionized water | 619 | 2348 |

These dispersions were prepared in the same manner as for Examples 1 and 2, except that for Example 3 an ultrasonic homogenizer rather than a Manton-Gaulin Dispersator™ was used. The final solids contents were 15.9% by weight for Example 3 and 31.0% by weight for Example 4.

Dispersions prepared as described above were then used to prepare autodeposition baths, which were used for actual coating as described below.

EXAMPLE 5

This example used an autodeposition bath having the following initial composition:

| Ingredient | Parts by Weight Used |
|---|---|
| Dispersion from Example 1 | 280 |
| Deionized water | 663 |
| Autophoretic ® Starter 219 | 53 |
| AB-255 ™ carbon black pigment | 4 |
| Fluorad ™ FC-430 | 0.4 |
| Dowfax ™ 2 A 1 | 0.04 |

Autophoretic® Starter 219 is a commercial acidic ferric fluoride solution available from the Parker+Amchem Division of Henkel Corporation. AB-255™ carbon black pigment is commercially available from Borden Chemical Co. Fluorad™ FC-430 is a commercial product of 3 M Company described by its manufacturer as a mixture of substantially pure fluoroaliphatic polymeric esters. Dowfax™ 2 A 1 is a surfactant commercially available from Dow Chemical Co.

Thin rectangular panels of cold rolled steel about 88×101 mm in size were cleaned by immersion in a commercial alkaline dip cleaner, then rinsed successively in tap water and deionized water. Sample panels thus prepared were immersed in the acidic autodeposition bath with a composition as given above for each of the time intervals given in Table 1. They were then removed from the coating bath, allowed to drain and air dry for 60 seconds, rinsed in tap water for 60 seconds, again allowed to drain and air dry for 60 seconds, and finally rinsed in deionized or tap water for a sufficient time to remove all remaining liquid from the coating bath. The coatings were then dried in an oven maintained at 180° to 190° C. for 20 minutes to obtain a solid coating. The thickness of coating formed is also shown in Table 1.

TABLE 1

COATING TIMES AND THICKNESSES FOR EXAMPLE 5

| Minutes of Contact Time: | 0.5 | 1.0 | 1.5 | 2.0 | 3.0 |
|---|---|---|---|---|---|
| Coating Thickness Formed, Microns: | 13 | 18 | 23 | 26 | 32 |

The coated samples thus prepared were free from any visually apparent cracks, craters, spots, or other coating uniformity defects and had desirable high gloss, good corrosion resistance, as measured by conventional salt spray testing, and good resistance to humidity.

EXAMPLE 6

This was performed in the same manner as Example 5, except that the autodeposition bath used has the following composition:

| Ingredient | Parts by Weight Used |
|---|---|
| Dispersion from Example 2 | 250 |
| Deionized water | 689 |
| Autophoretic ® Starter 219 | 53 |
| AB-255 ™ carbon black pigment | 4 |
| Fluorad ™ FC-430 | 1.0 |
| Alipal ™ EP-110 | 2.3 |

Alipal™ EP-110 is a commercial emulsifying agent from GAF Corporation, described by its supplier as the ammonium salt of an alkyl phenol-ethylene oxide condensate.

Samples coated with this composition had corrosion resistance, gloss, and humidity resistance approximately equal to samples with coatings of similar thickness from Example 5.

EXAMPLE 7

This was performed in the same manner as Example 5, except that the final rinse was with water (deionized) containing sufficient ammonium hydroxide to give a pH of 8. The gloss was as good and the corrosion resistance slightly better than for Example 5.

What is claimed is:

1. An autodeposition bath composition suitable for depositing by autodeposition a coating on an active metal surface of solid objects having surfaces constituted predominately of active metals contacted with the composition, consisting essentially of a mixture of:

(A) from about 1 to about 20% by weight of an epoxy resin component consisting of molecules having formula I:

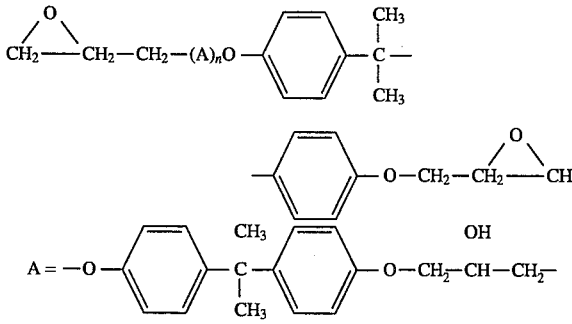

and n is an integer from 0 to 20;

(B) an emulsifying component consisting essentially of anionic surfactant in an amount that does not reduce the corrosion protection afforded to the underlying metal by a coating formed by autodeposition from said autodeposition bath composition and from about 0.1 to about 1.0 g/L of fluoroaliphatic polymeric ester emulsifying component, this amount being sufficient to stably emulsify component A;

(C) from about 0.1 to about 20% by weight of a crosslinking component selected from one or both of the following molecular types:
      (1) molecules containing at least two functional groups capable of addition reactions to epoxy groups when mixed with molecules of formula I and heated to a temperature of at least 100° C.; and
      (2) molecules containing at least two blocked isocyanate groups;

(D) an accelerator in sufficient amount to cause the dissolution of active metals from solid objects, having surfaces constituted predominantly of active metals, that are introduced into the composition at a temperature of at least 20° C. at a rate of at least about 0.02 gram equivalent weights of metal ions per hour per square decimeter of bare metal surface introduced into the bath; and, optionally, (F) pigments, dyes, or other chemically stable colorant materials;

(G) finely divided solids suitable as fillers in the coatings to be formed from the composition; and (H) water to form the balance of the composition.

2. A composition according to claim 1, wherein the cross-linking component (C) consists predominantly of molecules bearing at least two blocked isocyanate groups each.

3. A composition according to claim 1 having a pH in the range from about 2 to about 4.

4. A composition according to claim 2 having a pH in the range from about 2 to about 4.

5. A composition according to claim 2, wherein the cross linking component (C) is selected from molecules of the general formula II:

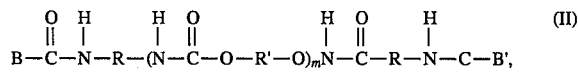

wherein each of B and B' independently is a monovalent moiety formed by removing the most active hydrogen atom from an amine, alcohol, amide, or oxime molecule; each of R and R' independently is a divalent hydrocarbon or carbonyl-hydrocarbon moiety derived by removing any two hydrogen atoms not attached to the same carbon atom from any hydrocarbon, or oxyhydrocarbon in which all oxygen atoms present are in carbonyl groups, having from 2 to 20 carbon atoms and having no unsaturation except aromatic and carbonyl unsaturation; and m is an integer from 0–20.

6. A composition according to claim 5 having a pH in the range from about 2 to about 4.

7. A composition according to claim 2, comprising from about 2 to about 10% by weight of an epoxy resin component consisting of molecules having formula I with n between 0 and 6 and from about 0.2 to about 10% by weight of a cross-linking component.

8. A composition according to claim 5, comprising from about 2 to about 10% by weight of an epoxy resin component consisting of molecules having formula I with n between 0 and 6 and from about 0.2 to about 10% by weight of a cross-linking component.

9. A composition according to claim 1, comprising from about 2 to about 10% by weight of an epoxy resin component consisting of molecules having formula I with n between 0 and 6 and from about 0.2 to about 10% by weight of a cross-linking component.

10. A composition according to claim 7 having a pH in the range from about 2 to about 4.

11. A composition according to claim 8 having a pH in the range from about 2 to about 4.

12. A composition according to claim 9 having a pH in the range from about 2 to about 4.

* * * * *